(12) United States Patent
Yurjevich

(10) Patent No.: US 11,260,697 B2
(45) Date of Patent: Mar. 1, 2022

(54) TIRE WITH TREAD FEATURES HAVING OFFSET PROTRUSIONS

(71) Applicant: Bridgestone Americas Tire Operations, LLC, Nashville, TN (US)

(72) Inventor: Martin A. Yurjevich, North Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 901 days.

(21) Appl. No.: 15/532,257

(22) PCT Filed: Oct. 22, 2015

(86) PCT No.: PCT/US2015/056850
§ 371 (c)(1),
(2) Date: Jun. 1, 2017

(87) PCT Pub. No.: WO2016/089501
PCT Pub. Date: Jun. 9, 2016

(65) Prior Publication Data
US 2017/0341471 A1    Nov. 30, 2017

Related U.S. Application Data

(60) Provisional application No. 62/087,303, filed on Dec. 4, 2014.

(51) Int. Cl.
*B60C 11/12* (2006.01)
*B60C 11/03* (2006.01)
(Continued)

(52) U.S. Cl.
CPC ...... *B60C 11/0302* (2013.01); *B60C 11/0306* (2013.01); *B60C 11/11* (2013.01);
(Continued)

(58) Field of Classification Search
CPC ..... B60C 2011/0386; B60C 2011/0388; B60C 2011/039; B60C 2011/0393;
(Continued)

(56) References Cited

U.S. PATENT DOCUMENTS 5,851,322 A * 12/1998 Hayashi .............. B60C 11/0302
152/209.2
2011/0290393 A1   12/2011 Berger et al.
(Continued)

FOREIGN PATENT DOCUMENTS

EP        0323165 A2 *  7/1989 .............. B60C 11/11
EP        1073562       1/2003
(Continued)

OTHER PUBLICATIONS

International Search Report and Written Opinion; Corresponding PCT Application No. PCT/US2015/056850; Bae, Geun Tae; Korean Intellectual Property Office, Seo-gu, Daejeon, Republic of Korea; dated Jan. 28, 2016.

*Primary Examiner* — Cedrick S Williams
(74) *Attorney, Agent, or Firm* — Shaun J. Fox; Bryan J. Jaketic

(57) ABSTRACT

A shear-controlled tire tread includes a plurality of narrow channels disposed generally perpendicular to a rolling direction. Each narrow channel includes a heel side, a toe side, and a valley connecting the heel side and the toe side, and a first plurality of ridges disposed on a heel side and a second plurality of ridges disposed on a toe side. The first plurality of ridges disposed on a heel side and the second plurality of ridges disposed on a toe side are offset and form interacting friction surfaces when a heel side of collapses toward a toe side or a toe side collapses toward a heel side.

7 Claims, 10 Drawing Sheets

(51) Int. Cl.
*B60C 11/11* (2006.01)
*B60C 11/13* (2006.01)

(52) U.S. Cl.
CPC ...... *B60C 11/1218* (2013.01); *B60C 11/1281* (2013.01); *B60C 2011/1209* (2013.01); *B60C 2011/1213* (2013.01); *B60C 2011/1338* (2013.01)

(58) Field of Classification Search
CPC ..... B60C 2011/0341; B60C 2011/1338; B60C 11/04; B60C 11/042; B60C 11/045; B60C 11/13; B60C 11/1307
See application file for complete search history.

(56) References Cited

U.S. PATENT DOCUMENTS

| | | | |
|---|---|---|---|
| 2013/0118662 A1* | 5/2013 | Kameda | B60C 11/0302 152/209.8 |
| 2014/0116589 A1* | 5/2014 | Grote | B60C 11/045 152/209.21 |

FOREIGN PATENT DOCUMENTS

| | | | | |
|---|---|---|---|---|
| JP | 2000177330 | | 6/2000 | |
| JP | 2000177330 A | * | 6/2000 | ......... B60C 11/1218 |
| JP | 2005119415 A | * | 5/2005 | |
| JP | 200644570 | | 2/2006 | |
| JP | 2010095036 | | 4/2010 | |
| JP | 2013006549 | | 1/2013 | |

* cited by examiner

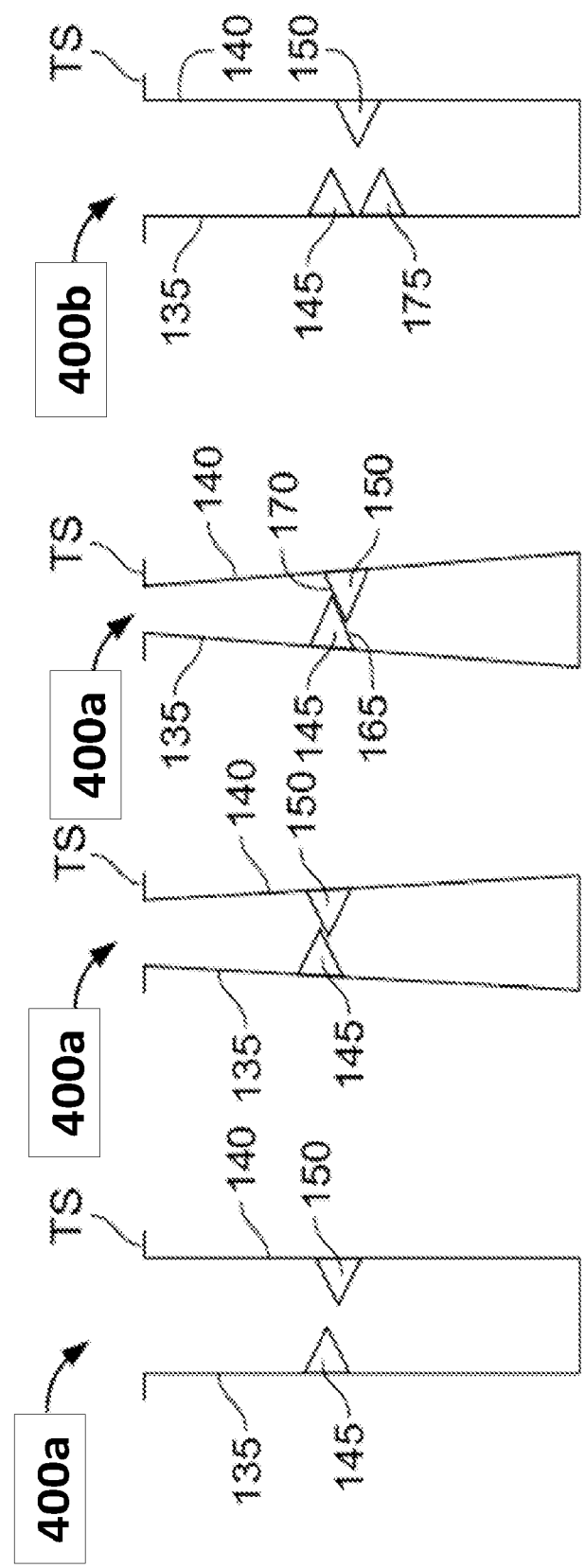

TIRE WITH TREAD FEATURES HAVING OFFSET PROTRUSIONS

FIELD OF INVENTION

The present disclosure is directed to a vehicle tire and tire tread. More particularly the present disclosure is directed to a vehicle tire having intra-tread features having offset protrusions. The tire may be pneumatic or non-pneumatic.

BACKGROUND

Known tire treads have a variety of voids, channels, grooves, slits, and sipes. The voids, channels, grooves, slits, and sipes may vary in width, length, depth, and planar orientation. Modifying the width, length, depth, and planar orientation of these features will impact various properties of the tire, such as noise, stiffness and handling, wear, and wet traction. Additionally, the voids, channels, grooves, slits, and sipes may also contain intra-tread features that impact various properties of the tire. Thus, the orientation and intra-tread features are modified to improve tire performance, including stiffness and handling, wear, and wet traction.

SUMMARY OF THE INVENTION

In one embodiment, a tire comprises at least two circumferential grooves, which extend continuously around the tire in a circumferential direction and at least three circumferential ribs, which extend around the tire in the circumferential direction, wherein the at least three circumferential ribs include two outer circumferential ribs, each of which is disposed between an outer edge of the tire tread and an axially-outer edge of a circumferential groove, and at least one inner circumferential rib disposed between axially-inner edges of at least two circumferential grooves. The tire further comprises a plurality of predominately-axial sipes, disposed on at least one circumferential rib, which extend across at least a portion of the circumferential rib, wherein at least one sipe in the plurality of predominately-axial sipes includes a first sipe wall and a second sipe wall that oppose each other. The first sipe wall includes a first protrusion that extends from the first sipe wall toward the second sipe wall and the second sipe wall includes a second protrusion that extends from the second sipe wall toward the first sipe wall, the first protrusion being offset from the second protrusion. When the tire is under normal inflation and no load, the first sipe wall and a second sipe wall each form an angle having an absolute value between 0 and 5 degrees with respect to the radial direction, and when the tire is under normal inflation and normal load, the first sipe wall and the second sipe wall located in the middle third of a tire footprint incline toward each other at an angle having an absolute value between 5 and 20 degrees with respect to the radial direction, and when the tire is under normal inflation and normal load, a bottom surface of the first protrusion and a top surface of the second protrusion located in the middle third of the tire footprint touch.

In another embodiment, a tire tread comprises an axial slit defined by a tread surface, a leading radial surface, a trailing radial surface, and a base connecting the leading radial surface and the trailing radial surface, wherein the axial slit intersects a main circumferential groove, a narrow circumferential groove, or a tread groove. A lead projection is disposed on the leading radial surface and a rear projection is disposed on the trailing radial surface, wherein the lead projection and the rear projection each have a base and straight or curved projection walls that intersect at least one common line or vertex. A bottom surface of the lead projection contacts a top surface of the rear projection when a shear force acts upon the tread surface and the leading radial surface, and the top surface of the rear projection contacts the bottom surface of the lead projection when a shear force acts upon the tread surface and the trailing radial surface. When a shear force acts upon the tread surface, the leading radial surface does not contact the trailing radial surface, such that the axial slit intersecting a main circumferential groove, narrow circumferential groove, or tread groove provides a path to the main circumferential groove, narrow circumferential groove, or tread groove.

In a different embodiment, a shear-controlled tire tread comprises a plurality of narrow channels disposed generally perpendicular to a rolling direction, each narrow channel having a heel side, a toe side, and a valley connecting the heel side and the toe side, and a first plurality of ridges disposed on a heel side and a second plurality of ridges disposed on a toe side, wherein the first plurality of ridges disposed on a heel side and the second plurality of ridges disposed on a toe side are offset and form interacting friction surfaces when a heel side collapses toward a toe side or a toe side collapses toward a heel side.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 1b is a callout of the sipes and protrusions shown in FIG. 1a;

FIG. 3b is a callout of the sipes and ridges shown in FIG. 3a;

FIGS. 4a-g are cross-sections taken along line 4-4 in FIG. 1a, FIG. 2, and FIG. 3a, of various embodiments of the sipes, axial slits, and channels shown in FIGS. 1-3, and;

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Normal inflation" as used in connection with pressure for a passenger tire applications, typically falls between 30-36 psi, although this range may vary in specific applications (e.g., when providing tires to meet a vehicle manufacturer's target).

"Tire load" as used herein, is defined by tire-industry standards manuals, such as those published by Tire & Rim Association, by a load formula for a given tire size and inflation pressure. In practice, for a passenger car, a normal load is typically defined by the vehicle load, plus accessory weights (in excess of 5 pounds and not previously included in the vehicle weight), plus two adult passengers (each approximated as weighing 150 pounds). Individual tire load is then determined by distributing to each axle its share of the curb weight, plus accessory weights, and occupant weight, and dividing by two.

"Tread width" refers to the width of the ground contact area of a tread which contacts with road surface during the rotation of the tire under normal inflation and load, that is, the distance between the left and right shoulders of the tread.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1A:
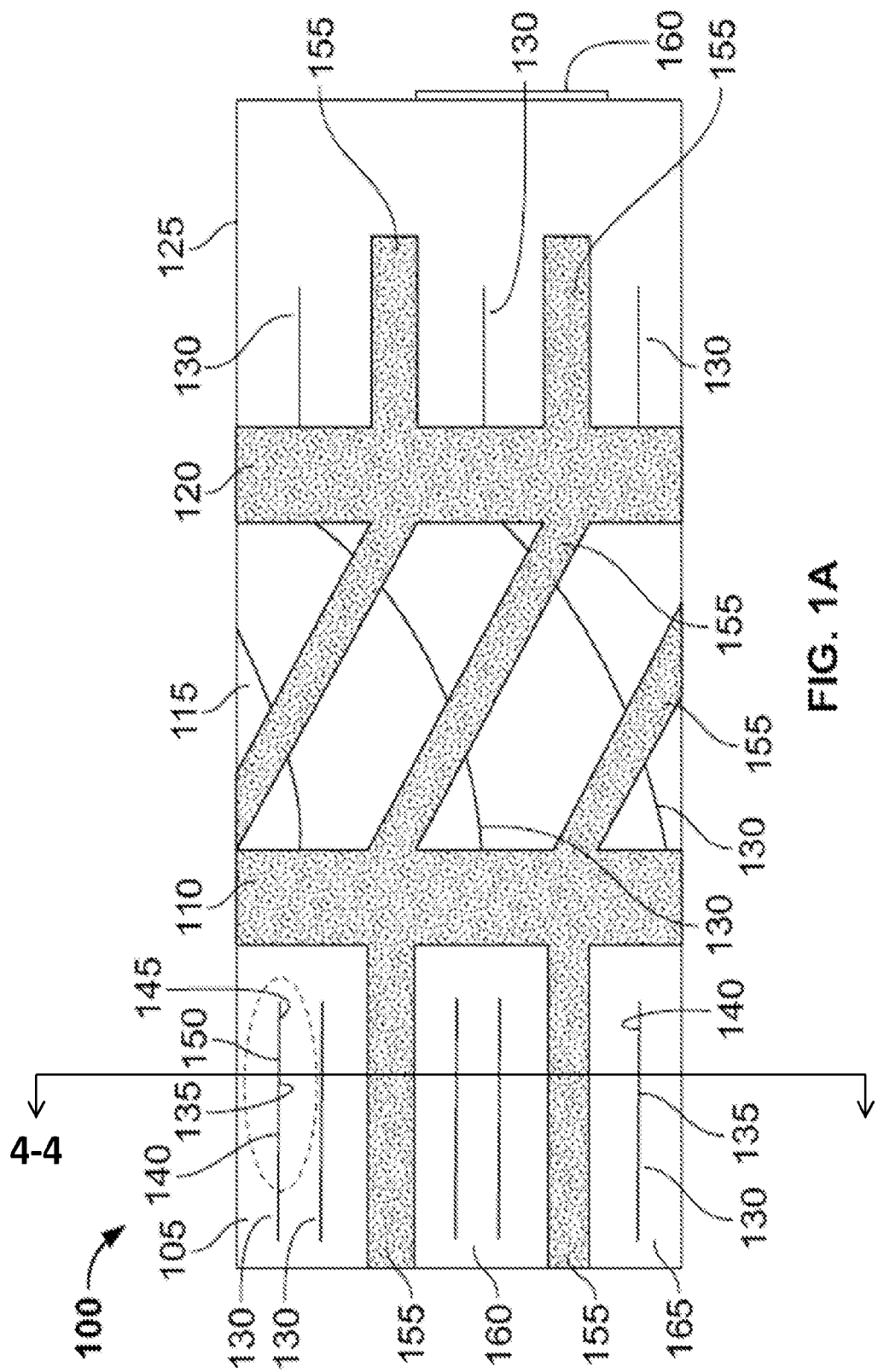
FIG. 1a is a top plan view of one embodiment of a new tire tread.

FIG. 1a is a top plan view of one embodiment of a tire tread 100. In FIG. 1a, tire tread 100 is new. It is understood that the tread pattern is repeated about the circumference of a tire.

As shown, tire tread 100 features circumferential grooves 110 and 120 that divide the tread into two outer circumferential ribs 105 and 125 and an inner or middle circumferential rib 115. In alternative embodiments (not shown), three or more circumferential grooves divide the tread into four or more circumferential ribs. In another embodiment, the width of a given circumferential groove is varied. In additional embodiments, the width of a given rib is varied.

Tire tread 100 also features sipes 130 that extend across ribs 105, 115 and 125. As shown, the sipes 130 on outer ribs 105 and 125 are predominately-axial sipes because the axial displacement of the sipes is greater than the circumferential displacement of the sipes. In alternative embodiments (not shown), the sipes are disposed at an angle having an absolute value of between 1 and 5 degrees with respect to the axial direction. In another embodiment, the sipes are disposed at an angle having an absolute value of between 0 and 1 degree with respect to the axial direction.

As shown, the sipes 130 on middle rib 115 are curved sipes. In alternative embodiments (not shown), the sipes are not curved.

Figure 1B:
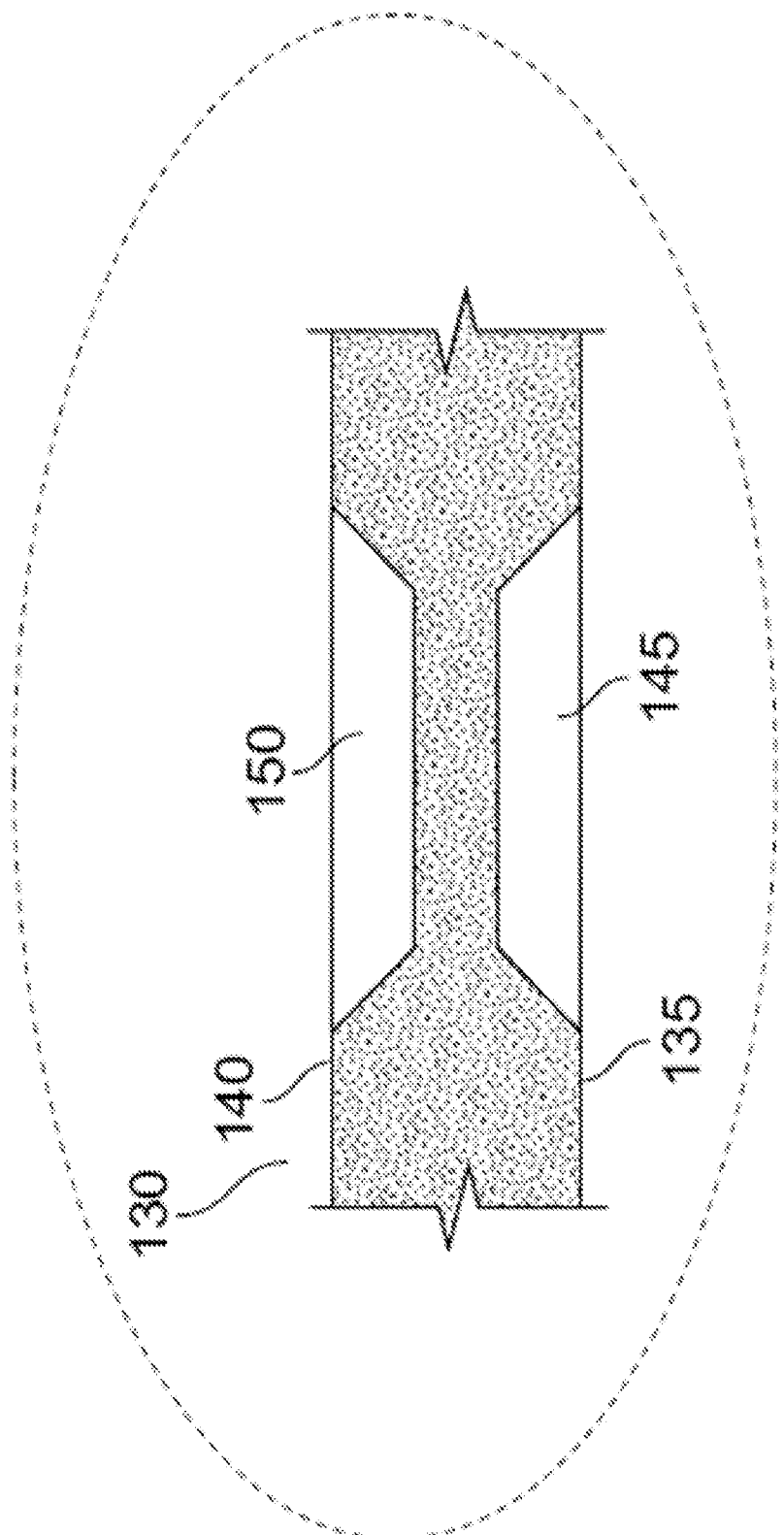

With reference to FIG. 1a and FIG. 1b, the sipes 130 on outer ribs 105 and 125 have a first sipe wall 135 and a second sipe wall 140. The first and second sipe walls oppose each other. The first sipe wall 135 includes a first protrusion 145 that extends from the first sipe wall 135 toward the second sipe wall 140 and the second sipe wall 140 includes a second protrusion 150 that extends from the second sipe wall 140 toward the first sipe wall 135. The first protrusion 145 is radially offset from the second protrusion 150. As one of ordinary skill in the art will understand, the sipes and protrusions may be manufactured via additive manufacturing (i.e., 3D printing), casting, molding, or stamping.

In another embodiment (not shown), the tire tread has a first plurality of sipes having a first sipe wall with a first protrusion and a second sipe wall having a second protrusion and a second plurality of sipes that lack protrusions, projections, or ridges. In yet another embodiment, the tire tread has a first plurality of sipes having a first sipe wall with a first protrusion and a second sipe wall having a second protrusion, a second plurality of sipes with a first sipe wall having a first protrusion and a second sipe wall having a second protrusion, and a third plurality of sipes that lack protrusions, projections, or ridges. In additional embodiments, the first and second sipe walls may have more than two protrusions. Likewise, although the sipes shown on middle rib in FIG. 1a do not have protrusions, sipes disposed on middle rib may also contain protrusions that are substantially similar to the sipes disposed on an outer rib.

As shown, sipes 130 on outer rib 105 extend across a portion of the rib and do not intersect circumferential groove 110. In contrast, sipes 130 on outer rib 125 extend from circumferential groove 120. In an alternative embodiment (not shown), all of the sipes intersect a circumferential groove. In another alternative embodiment, approximately half of the sipes on a tire intersect a circumferential groove. When the sipes intersect a circumferential groove, water may escape into the circumferential groove along the bottoms of the sipes if an upper portion of a sipe is obstructed or closed.

Tire tread 100 also features grooves 155. As shown, the grooves 155 are predominately-axial grooves that follow a linear path across ribs 105, 115 and 125. In a specific alternative embodiment (not shown), the grooves are predominately circumferential grooves (i.e., the circumferential displacement of the grooves is greater than the axial displacement of the grooves). As one of ordinary skill in the art will understand, the grooves may follow a number of paths (curved, sinusoidal, straight, diagonal, bent, zigzag, etc.) in a number of orientations (axial, circumferential, diagonal, meandering, etc.).

Grooves 155 divide ribs 105 and 125 into tread blocks 160. Grooves 155 divide outer rib 105 into discrete tread blocks 160 because the grooves extend completely across the rib, and grooves 155 divide outer rib 125 into partial tread blocks 160 because the grooves do not extend completely across the rib. In an alternative embodiment (not shown), one groove intersects an adjacent groove to create a discrete tread block. In additional embodiments, various grooves divide various portions of the tread into blocks. As one of ordinary skill in the art will understand, the grooves may form tread blocks in a variety of shapes.

As shown, outer rib 105 contains two sipes per tread block, and outer rib 125 contains one sipe per tread block. Where one row of tread blocks corresponds to a tire pitch (not shown), there are three sipes per pitch. As one of ordinary skill in the art will understand, the number of tread sipes per block or pitch may be varied.

Figure 2:
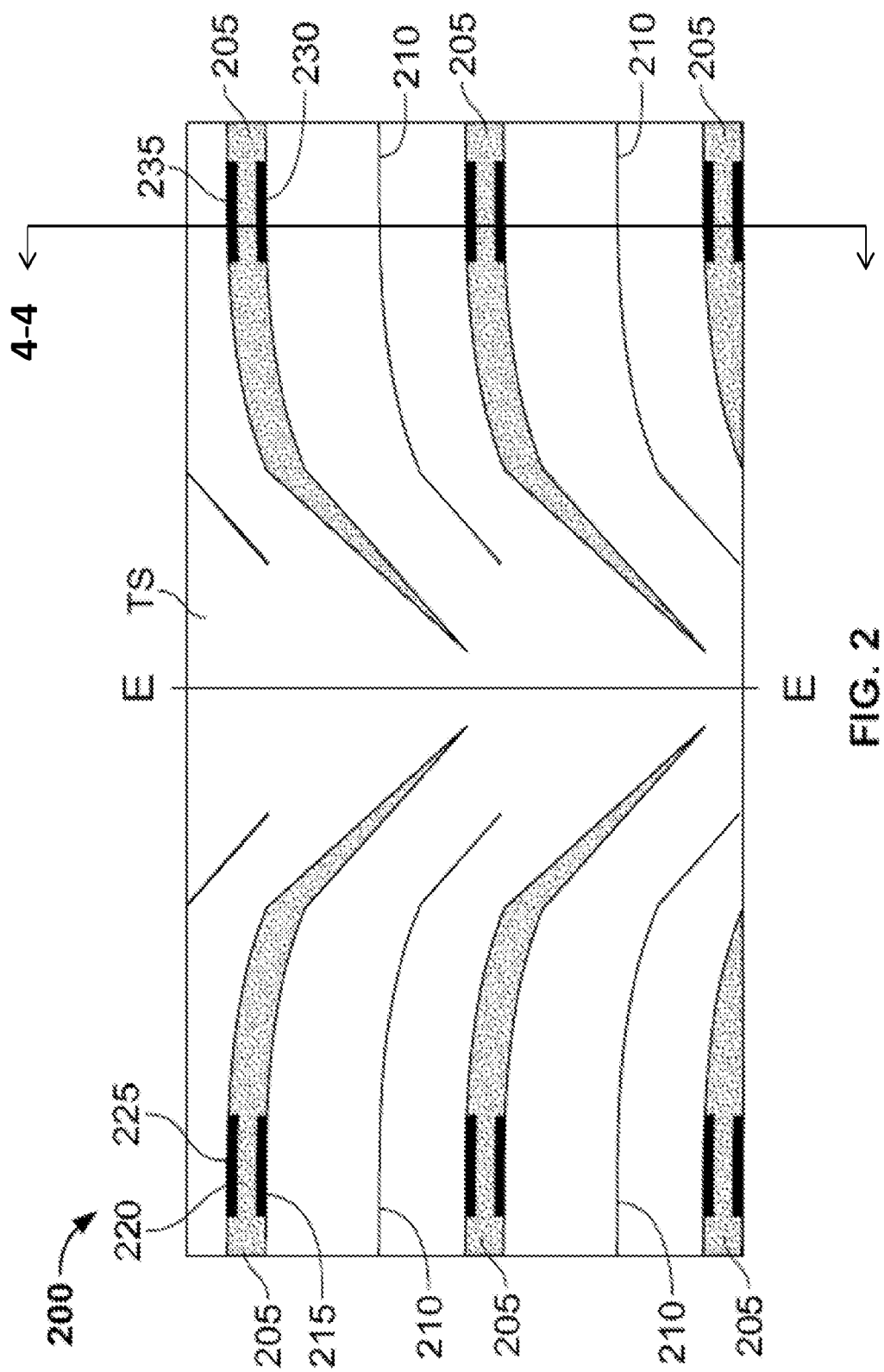
FIG. 2 is a top plan view of an alternative embodiment of a new tire tread.

FIG. 2 is a top plan view of one embodiment of a tire tread 200. In FIG. 2, tire tread 200 is new. It is understood that the tread pattern is repeated about the circumference of a tire. The tire tread's equatorial plane, E, divides the tread into halves.

As shown, tire tread 200 features axial slits 205 and 210 that extend from the tread edge. Each axial slit is defined by the tread surface, TS, a leading radial surface 215, a base 220, and a trailing radial surface 225. The base 220 extends along the length of the axial slits 205 and 210 connects the leading radial surface 215 and the trailing radial surface 225.

As shown, axial slits 205 and 210 feature a lead projection 230 disposed on the leading radial surface 215 and a rear projection 235 disposed on the trailing radial surface 225. In alternative embodiments (not shown), lead and rear projections are omitted from a portion of the axial slits. For example, lead and rear projections may be omitted once from every second, third, fourth, or fifth axial slit. Conversely, lead and rear projections may be included once in every second, third, fourth, or fifth axial slit.

The axial slits 205 and 210 do not connect to a circumferential groove, narrow groove, tread groove, or sipe. But, as one of ordinary skill in the art would understand, the axial slits may connect to a circumferential main groove, narrow groove, or sipe if these features are present.

As shown, axial slits 205 continually narrow as they approach the middle of the tread. In another embodiment (not shown), one or more axial slits narrow at a discrete point. In yet another embodiment, one or more axial slits maintain a constant width.

As shown, axial slits 205 and 210 follow a slightly curved path as they approach the middle of the tread. In another embodiment (not shown), one or more axial slits follow a predominately linear path. In an alternative embodiment, one or more axial slits follow a bent or pitched path. In additional embodiments, one or more axial slits follow a cycloid path generated by a circle having a radius, R, wherein TW≤5R≤5TW and TW=the tread width.

When tire tread 200 is divided into pitches (not shown), the axial slits may divide the tread into pitches. In another embodiment (also not shown), at least one axial slit is disposed in each pitch. In a different embodiment, multiple axial slits are disposed in each pitch.

Figure 3A:
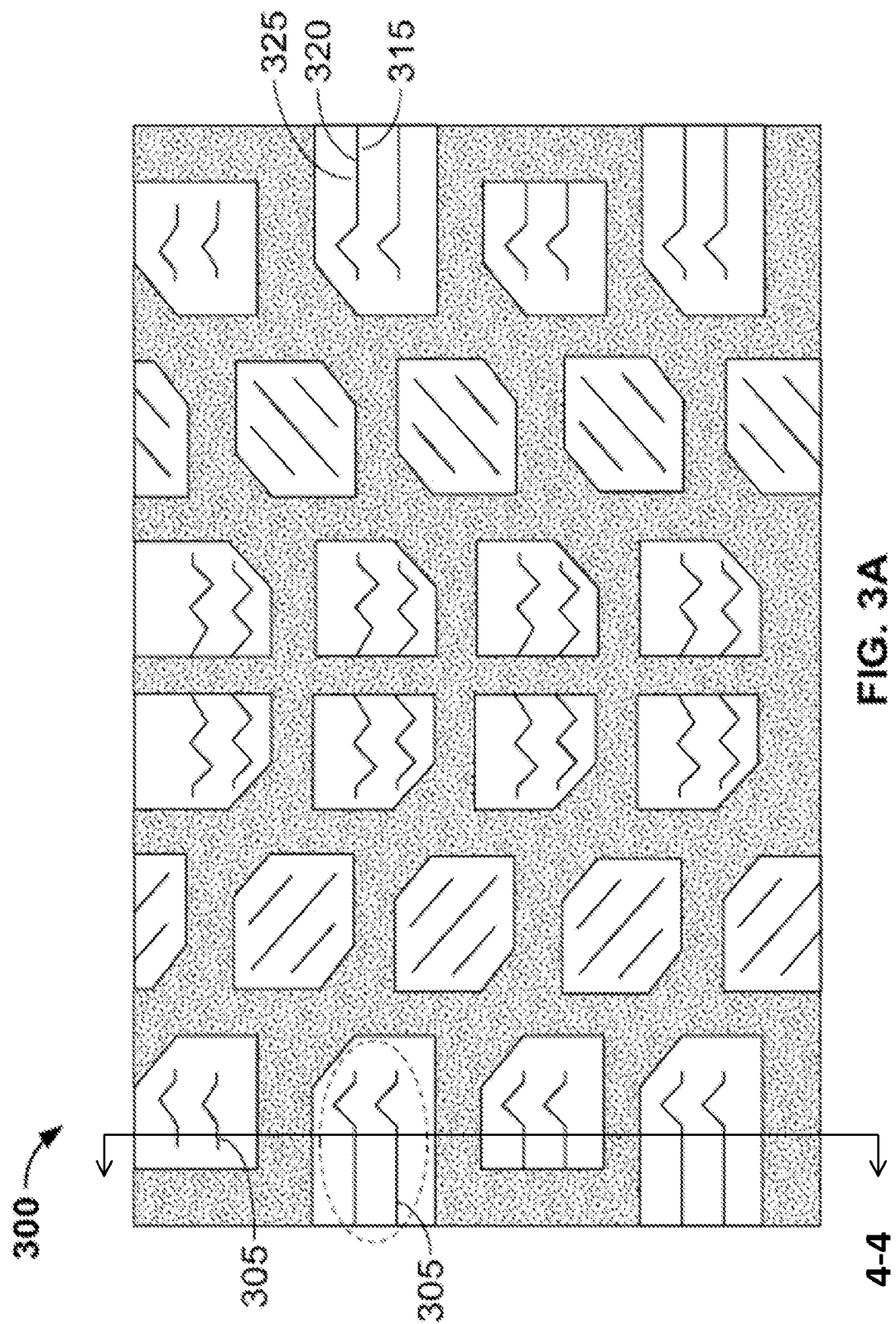
FIG. 3a is a top plan view of another alternative embodiment of a new tire tread.

FIG. 3a is a top plan view of a tire tread 300. In FIG. 3a, tire tread 300 is new. It is understood that the tread pattern is repeated about the circumference of a tire.

Tire tread 300 features a first plurality of channels 305 and a second plurality of channels 310 that are disposed generally perpendicular to a rolling direction. Each channel 305 has a heel side 315, a valley 320, and a toe side 325. The valley 320 connects the heel side 315 and the toe side 325.

In the embodiment shown in FIG. 3a, the channels are narrow channels and have a width between about 0.3 mm and 3.0 mm. In another embodiment (not shown), the channels are narrow channels and have a width between 0.60 mm and about 0.90 mm. In an alternative embodiment, the channels are narrow channels and have a width between about 0.30 mm and about 0.60 mm. In a different embodiment, the narrow channels have a width between about 1.20 mm and about 1.80 mm. In an additional embodiment, the channels are wide channels and have a width between about 3.1 mm and 5.0 mm. In a specific embodiment, the narrow channels have a width of about 1.4 mm and about 1.6 mm and a height of about 7 mm. In yet another embodiment, the channels are voids. As one of ordinary skill in the art will understand, channels with larger widths are particularly suitable for all-terrain vehicles. Likewise, one of ordinary skill in the art will understand that the channels may be manufactured via additive manufacturing (3D printing), casting, molding, or stamping.

Figure 3B:
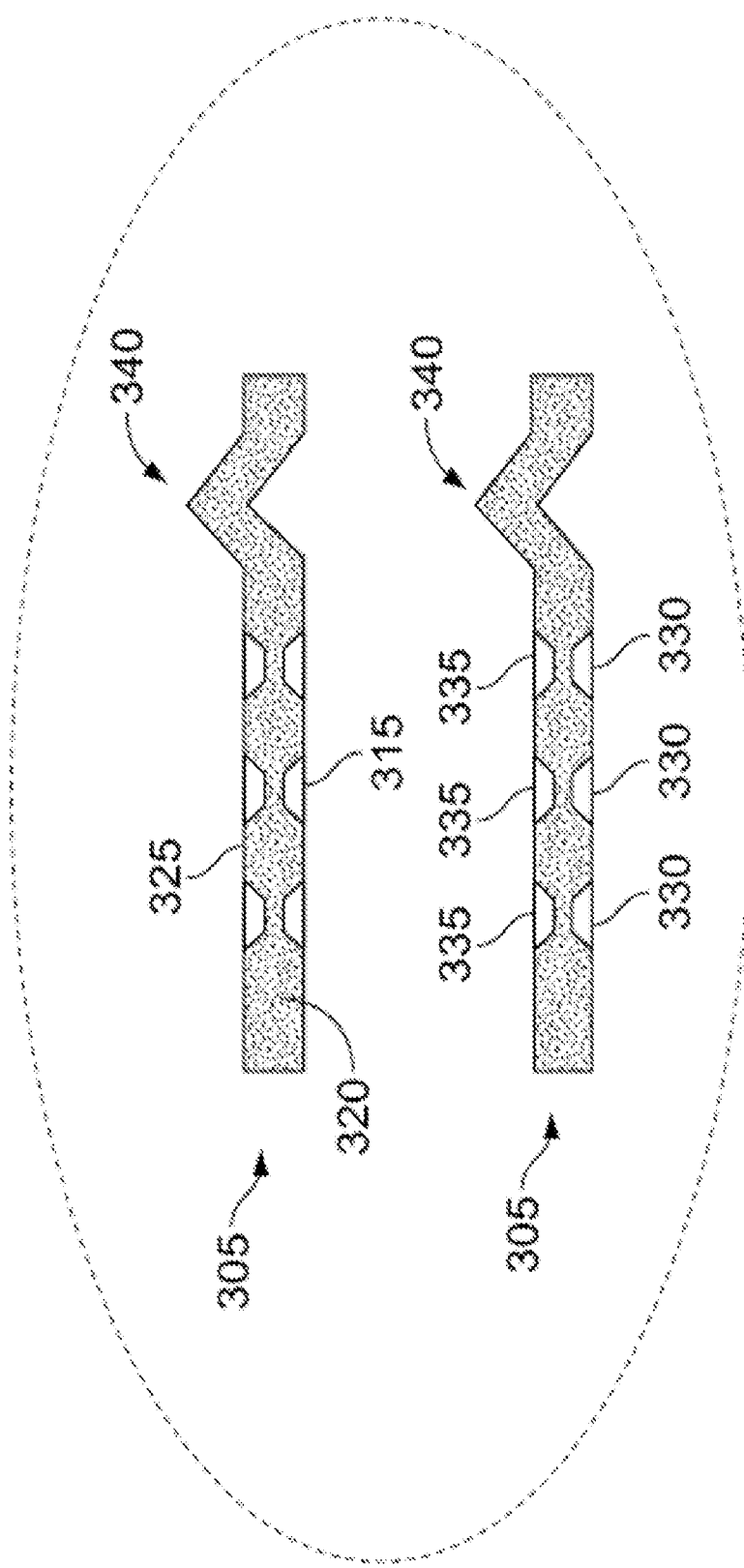

As shown in FIG. 3b, a first plurality of ridges 330 is disposed on heel side 315, and a second plurality of ridges 335 is disposed on a toe side 325. The first plurality of ridges 330 and the second plurality of ridges 335 are offset and form interacting friction surfaces when heel side 315 collapses toward toe side 325 or a toe side 325 collapses toward heel side 315. In the embodiment shown in FIG. 3b, the first plurality of ridges and the second plurality of ridges are offset radially. In another embodiment (not shown), the first plurality of ridges disposed on a heel side and the second plurality of ridges disposed on a toe side are offset along an axis that is disposed generally perpendicular to a rolling direction.

As shown in FIG. 3, the channels 305 and 310 on an outer portion of the tire have a linear continuity and are disposed generally perpendicular to a rolling direction. As shown, channels 310 further comprise diversions 340. The diversions lack ridges, protrusions, or projections. As shown, diversions 340 are short and angular, and they align in a circumferential direction. Thus, the diversions interrupt a linear continuity of the channels. The diversions are characterized as short because their height and length is a fraction (less than 33%) of the length of the channels. In another embodiment (not shown), the diversions alternate in a circumferential direction. In additional embodiments, the diversions are crenellated, wavy, semi-circular, or sinusoidal.

FIGS. 4a-g are cross-sections of various embodiments of sipes, slits, and channels, taken along line 4-4 in FIGS. 1-3. Although certain of FIGS. 4a-g employ reference numerals that specifically correspond to only one of FIGS. 1-3, it should be understood that this was merely done for convenience and that any of the profiles shown in FIGS. 4a-g may correspond with any of the treads shown in FIGS. 1-3 or other alternative treads.

FIG. 4a shows one embodiment of a sipe 400a with first sipe wall 135 and second sipe wall 140. The first and second sipe walls oppose each other. The first sipe wall 135 includes a first protrusion 145 that extends from the first sipe wall 135 toward the second sipe wall 140 and the second sipe wall 140 includes a second protrusion 150 that extends from the second sipe wall 140 toward the first sipe wall 135. The first protrusion 145 is radially offset from the second protrusion 150. Exemplary heights for the sipe walls range from, without limitation, about 6.0 mm to 9.0 mm for passenger tire applications, and about 10.0 to 12.0 mm for all-terrain tire applications. As one of ordinary skill in the art will understand, the height of a sipe wall can vary on a tire-to-tire or tire application-by-application basis.

FIG. 4a illustrates a sipe 400a in a tire under normal inflation and no load. As shown, the first sipe wall 135 and a second sipe wall 140 are in a radial direction. In additional embodiments (not shown), the first sipe wall and a second sipe wall each form an angle having an absolute value between 0 and 5 degrees with respect to the radial direction when the tire under normal inflation and no load. In an alternative embodiment, the sipe walls converge toward the tread surface, and therefore expand in width as the tread wears. In another embodiment, the sipe walls taper in the radial direction, and therefore narrow in width as the tread wears. Exemplary widths for convergent or tapered sipes include, without limitation 0.5 mm and 0.7 mm.

FIG. 4b illustrates the sipe 400a in a tire under normal inflation and a relatively small shear force. As shown, the first sipe wall 135 and a second sipe wall 140 located in the middle third of a tire footprint incline toward each other due to a small, initial shear force. The first protrusion 145 and the second protrusions 150 barely do not touch each other.

FIG. 4c illustrates the sipe 400a in a tire under normal inflation and a relatively large shear force. Events including, without limitation, acceleration and braking can impart shear forces. As shown, the first sipe wall 135 and a second sipe wall 140 located in the middle third of a tire footprint incline toward each other due to a shear force. As shown, a bottom surface 165 of the first protrusion 145 and a top surface 170 of the second protrusion 150 located in the middle third of the tire footprint touch. Such contact may enhance control of a tire's stiffness and handling, wear, and wet traction attributes. Further, this contact allows for a gradual increase in tread stiffness rather than an abrupt increase in stiffness. In additional embodiments (not shown), the first sipe wall and second sipe wall incline toward each other at an angle having an absolute value between 5 and 20 degrees with respect to the radial direction so that the first and second protrusions touch.

FIG. 4d illustrates an alternative embodiment of a sipe 400b having a third protrusion 175. As shown, the third protrusion 175 is disposed on the first sipe wall 135 and is radially offset from the first protrusion 145 and the second protrusion 150. When a tire under normal inflation and normal load is subjected to a shear force, a bottom surface of the first protrusion and a top surface of the second protrusion located in the middle third of the tire footprint touch, and a bottom surface of the second protrusion and a top surface of the third protrusion located in the middle third of the tire footprint touch (not shown). In an alternative embodiment (not shown), the third protrusion is disposed on the second sipe wall.

Figures 4E, 4F, 4G:
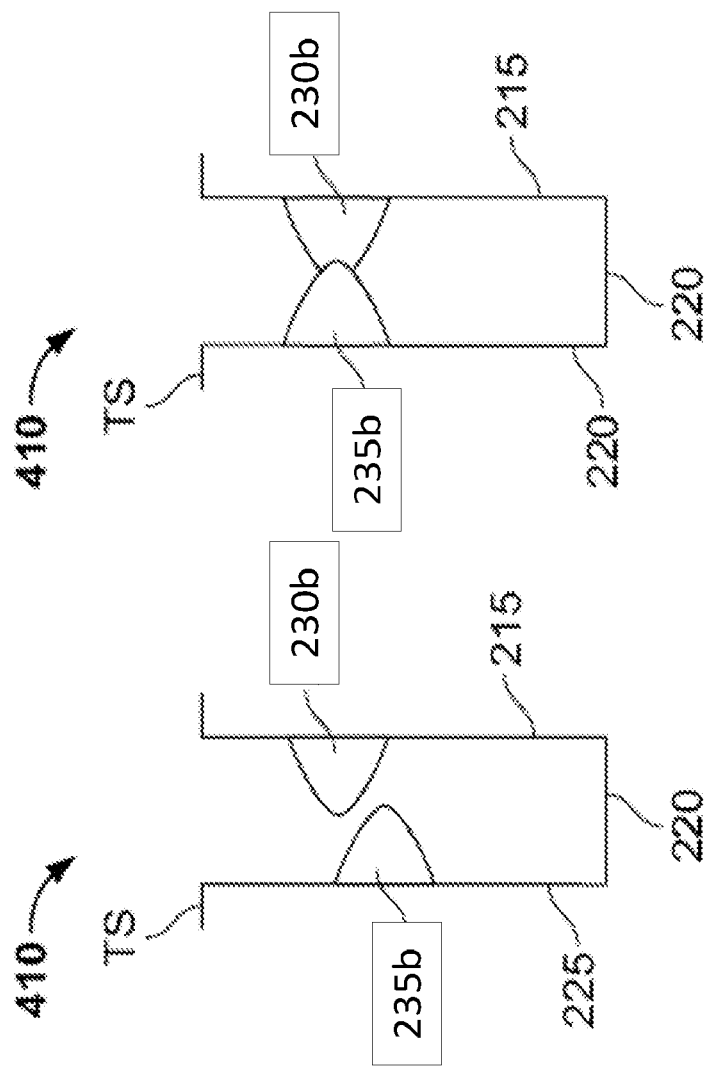

FIG. 4e shows an axial slit 410 that is defined by the tread surface, TS, a leading radial surface 215, a base 220, and a trailing radial surface 225. The base 220 connects the leading radial surface 215 and the trailing radial surface 225.

Axial slit 410 features a lead projection 230a disposed on the leading radial surface 215 and a rear projection 235a disposed on the trailing radial surface 225. The lead projection 230a and rear projection 235a each have a base 240 and projection walls 245 that intersect at a common line or vertex 250. The base may be polygonal, circular, elliptical, reniform, or a variant of these shapes. When a sufficient shear force is applied at the tread surface (such as by braking or accelerating), the leading projection and rear projection slide against each other. While the lead projection 230a and rear projection 235a are shown as the same shape, they need not be identical.

As shown, the projection walls 245 are curved. In an alternative embodiment (not shown), the projection walls are straight. As one of ordinary skill in the art will understand, the projections walls may form a variety of three-dimensional structures, including without limitation, a wedge, cone, pyramid, prism, or frustum shape. These shapes may be regular or irregular.

As shown in FIG. 4f, the width of projections (and therefore the space between the projections) may be varied so that the projections touch after a small shear force is applied. Likewise, the projections may be configured so that they contact each other upon a first range of shear forces and contact an opposing sipe wall over a second range of shear forces.

In one instance, a typical range of normally applied normal forces falls in a range from 25-100 psi. For a case where the sipe contact surfaces meet at approximately 45 degrees relative to the circumferential orientation of the tire (or approximately 45 degrees relative to the radius of the tire) and full surface-to-surface contact between the opposing protrusions is realized, the range of shear forces would be from approximately 0.4 lbs to 3.0 lbs at the interface surface (assuming a rubber-to-rubber frictional coefficient of 1.16). This value would be multiplied by the number of shear faces in contact during loading. This would cover the range of sipe protrusions that axially would cover 25 to 80% of the sipe length respectively.

As one of ordinary skill in the art will understand, the intra-tread feature configurations disclosed herein allow for a gradual variation in tread stiffness over a tread void, channel, groove, slit, or sipe.

FIG. 4g shows another alternative embodiment in which the lead projection 230b and rear projection 235b have the same radial height, but are offset axially. When the lead projection 230b and rear projection 235b are offset axially, the sides of the projections slide against each other when a sufficient shear force is applied at the tread surface.

As one of ordinary skill in the art will understand, the embodiments shown in FIGS. 4a-g may be used or modified for use in the sipes, axial slits, and channels shown in FIGS. 1-3.

Figure 5A:
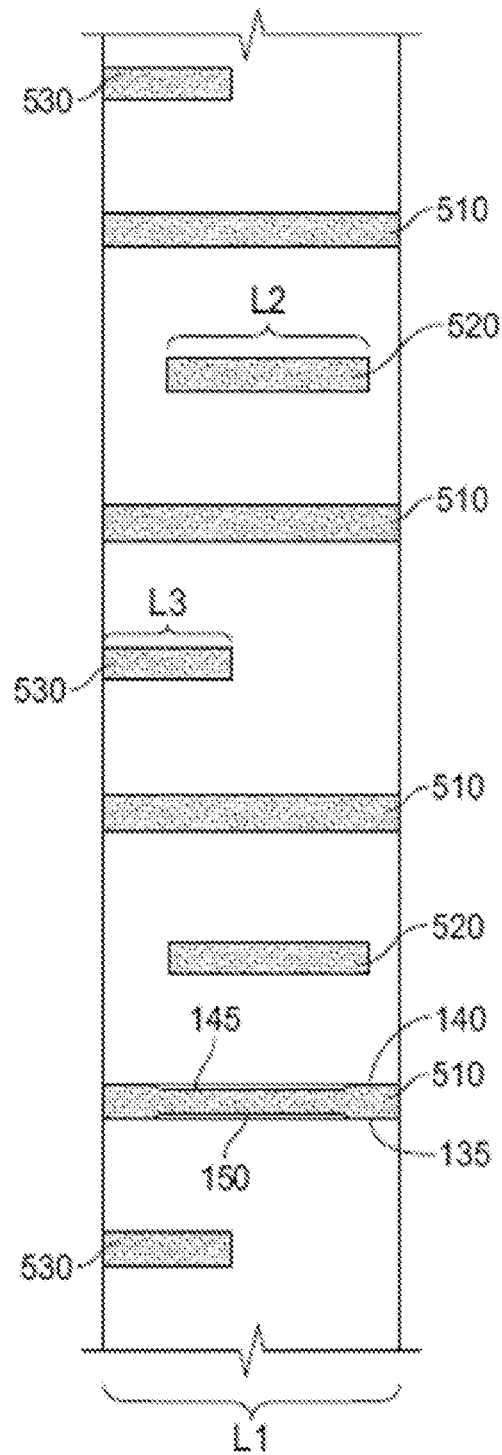
FIGS. 5a-5c are top plan views of alternative embodiments of the sipes, axial slits, and channels shown in FIGS. 1-3.
Figure 5B:
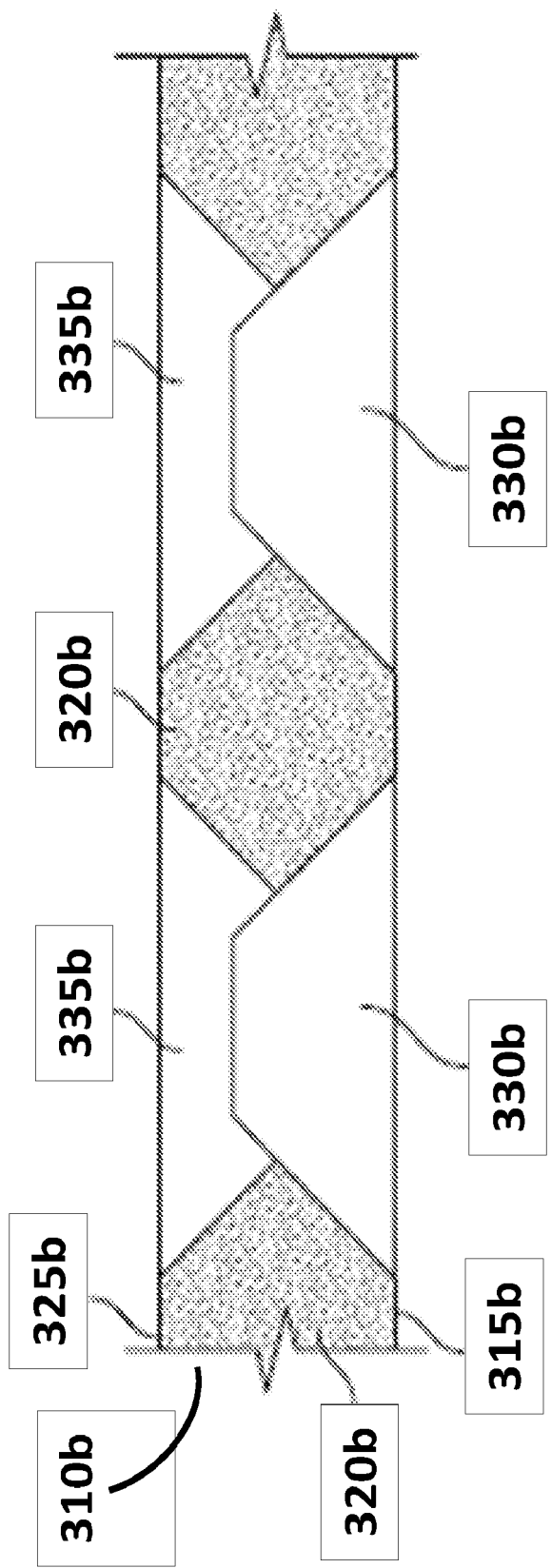
Figure 5C:
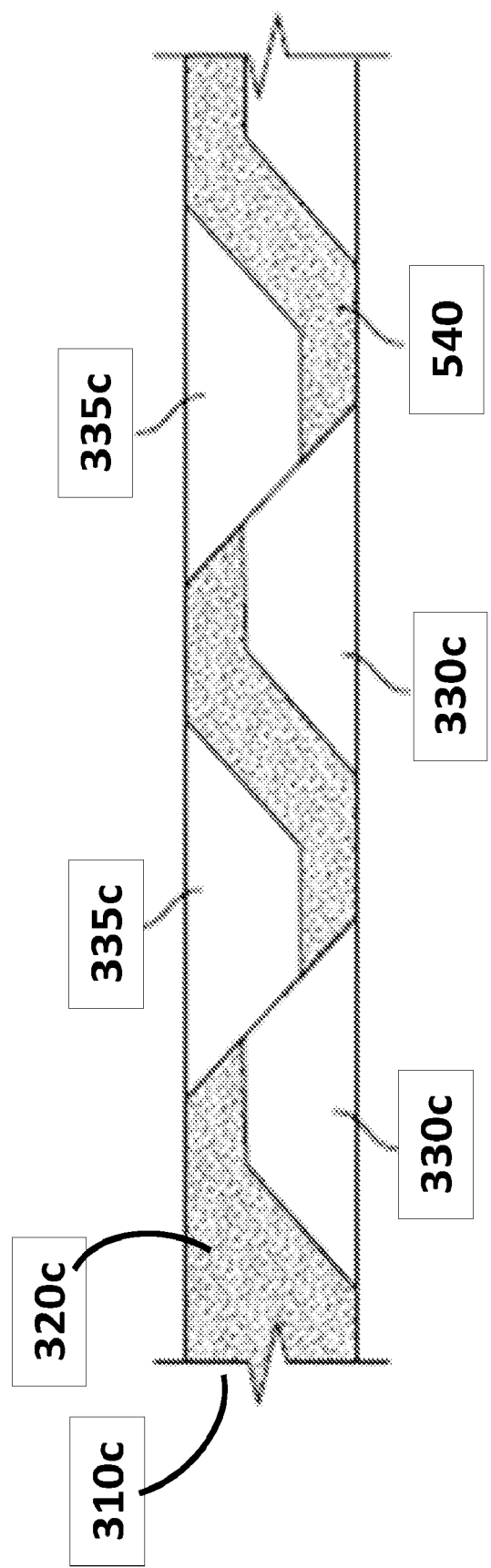

FIGS. 5a-5c are top plan views of alternative embodiments of the sipes, axial slits, and channels shown in FIGS. 1-3.

FIG. 5a shows a portion of a tire tread 500 with a first plurality of sipes 510, a second plurality of sipes 520, and a third plurality of sipes 530. The first plurality of sipes 510, which have a length of $L_1$, extend across an entire tread block. The second plurality of sipes 520, which have a length of $L_2$, extend across a majority of the tread block. The third plurality of sipes 530, which have a length of $L_3$, extend across a portion of the tread block. As shown, the sipes are linear. In alternative embodiments (not shown), the sipes may be slightly curved.

As shown, each sipe in the first plurality of sipes 510 has a first sipe wall 135 and a second sipe wall 140. Each first sipe wall 135 includes a first protrusion 145 that extends from each first sipe wall 135 toward each second sipe wall 140, and each second sipe wall 140 includes a second protrusion 150 that extends from each second sipe wall 140 toward each first sipe wall 135. Each first protrusion 145 is radially offset from each second protrusion 150. The second and third plurality of sipes, 520 and 530, may also have two or more protrusions (not shown).

As shown, each first protrusion 145 and each second protrusion 150 extends along a portion of $L_1$, the length of the first plurality of sipes 510. In one embodiment (not shown), the protrusions extend along 5-30% of $L_1$. In another embodiment, the protrusions extend along 10-40% of $L_1$. In another embodiment, the protrusions extend along 20-50% of $L_1$. In another embodiment, the protrusions extend along 35-65% of $L_1$. In another embodiment, the protrusions extend along 50-80% of $L_1$. In another embodiment, the protrusions extend along 60-90% of $L_1$. In another embodiment, the protrusions extend along 90-100% of $L_1$.

In embodiments where the second plurality of sipes contain protrusions (not shown), the protrusions may extend along a portion of $L_2$. In embodiments where the third plurality of sipes contain protrusions (also not shown), the protrusions may extend along a portion of $L_3$. As one of ordinary skill in the art will understand, the ranges described in relation to $L_1$ may be implemented in relation to $L_2$ and to $L_3$.

FIG. 5b shows a portion of a tire tread 500 with a channel 310b. The channel has a heel side 315b, a valley 320b, and a toe side 325b. Channel 310b has a first plurality of ridges 330b disposed on heel side 315b and a second plurality of ridges 335b disposed on a toe side 325b.

As shown in FIG. 5b, channel 310b is in a tire under normal inflation and normal load. As shown, heel side 315b and toe side 325b are located in the middle third of a tire footprint incline toward each other due to a shear force. The first plurality of ridges 330b is radially offset from the second plurality of ridges 335b. Thus, when viewed from above, the first plurality of ridges 330b partially eclipses the second plurality of ridges 335b. In an alternative embodiment (not shown), the first plurality of ridges completely eclipses the second plurality of ridges.

FIG. 5c shows a portion of a tire tread 500 with a channel 310c. In this embodiment, the first plurality of ridges 330c is axially offset from the second plurality of ridges 335c. A radial evacuation pathway 540 is formed between interacting friction surfaces. The radial evacuation pathway 540 allows water to leave valley 320c when a shear force is applied at the tread surface. Thus, as shown in FIG. 5c, when viewed from above, the first plurality of ridges 330c and second plurality of ridges 335c partially eclipses the valley 320c. In an alternative embodiment (not shown), the first and second pluralities of ridges may completely eclipse the valley.

As one of ordinary skill in the art would understand, the tire embodiments described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses. One of ordinary skill in the art would also understand that the embodiments described in this disclosure may be utilized with a variety of tread patterns, including, without limitation, symmetrical, asymmetrical, directional, studded, and stud-less tread patterns. One of ordinary skill in the art would also understand that the embodiments described in this disclosure may be utilized, without limitation, in high-performance, winter, all-season, touring, non-pneumatic, and retread tire applications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
   at least at least two circumferential grooves, which extend continuously around the tire in a circumferential direction and at least three circumferential ribs, which extend around the tire in the circumferential direction, wherein the at least three circumferential ribs include two outer circumferential ribs, each of which is disposed between an outer edge of a tire tread and an axially-outer edge of a circumferential groove, and at least one inner circumferential rib disposed between axially-inner edges of at least two circumferential grooves;
   a plurality of predominately-axial sipes, disposed on at least one circumferential rib, which extend across at least a portion of the circumferential rib;
      wherein at least one sipe in the plurality of predominately-axial sipes includes a first sipe wall and a second sipe wall that oppose each other;
      wherein the first sipe wall includes a first protrusion that extends from the first sipe wall toward the second sipe wall and the second sipe wall includes a second protrusion that extends from the second sipe wall toward the first sipe wall, the first protrusion being offset from the second protrusion;
      wherein, when the tire is under normal inflation and no load, the first sipe wall and a second sipe wall each form an angle having an absolute value between 0 and 5 degrees with respect to the radial direction;
      wherein, when the tire is under normal inflation and normal load, the first sipe wall and the second sipe wall located in a middle third of a tire footprint incline toward each other at an angle having an absolute value between 5 and 20 degrees with respect to the radial direction, and;
      wherein, when the tire is under normal inflation and normal load, a bottom surface of the first protrusion and a top surface of the second protrusion located in the middle third of the tire footprint touch.

2. The tire of claim 1 wherein the bottom surface of the first protrusion forms an acute angle with respect to the first sipe wall and the second protrusion forms an obtuse angle with respect to the second sipe wall.

3. The tire of claim 1 wherein the plurality of predominately-axial sipes extend from the at least two circumferential grooves such that the plurality of predominately axial sipes open to the at least two circumferential grooves when the tire is under normal inflation and normal load.

4. The tire of claim 1 wherein the distance between the uppermost point of the first protrusion and the point where the first sipe wall intersects the tread surface is smaller than the distance between the uppermost point of the second protrusion and the point where the second sipe wall intersects the tread surface.

5. The tire of claim 1 wherein the first protrusion extends along 10-40% of the length of the first sipe wall, the second protrusion extends along 10-40% of the length of the second sipe wall.

6. The tire of claim 1 wherein the axial cross section of the first protrusion and the circumferential cross section of the second protrusion is one of a triangular or semicircular shape.

7. The tire of claim 1, wherein the first protrusion is axially aligned with the second protrusion and wherein the first protrusion is radially offset from the second protrusion.

\* \* \* \* \*